United States Patent [19]

DeCristofaro et al.

[11] 4,302,515

[45] * Nov. 24, 1981

[54] NICKEL BRAZED ARTICLES

[75] Inventors: Nicholas J. DeCristofaro, Chatham, N.J.; Peter Sexton, Weston, Conn.

[73] Assignee: Allied Corporation, Morris Township, Morris County, N.J.

[*] Notice: The portion of the term of this patent subsequent to Apr. 10, 1996, has been disclaimed.

[21] Appl. No.: 68,266

[22] Filed: Aug. 20, 1979

Related U.S. Application Data

[63] Continuation-in-part of Ser. No. 8,370, Feb. 1, 1979, abandoned, which is a continuation-in-part of Ser. No. 912,667, Jun. 5, 1978, Pat. No. 4,148,973, which is a continuation of Ser. No. 751,000, Dec. 15, 1976, abandoned.

[51] Int. Cl.$^3$ .............................................. B32B 15/04
[52] U.S. Cl. ..................... 428/680; 75/170; 75/171; 428/678; 428/679
[58] Field of Search ............. 75/170, 171; 228/263 A; 148/32; 428/678–680, 606

[56] References Cited

U.S. PATENT DOCUMENTS

| | | | |
|---|---|---|---|
| 3,856,513 | 12/1974 | Chen et al. | 75/171 |
| 3,871,836 | 3/1975 | Polk et al. | 75/170 |
| 4,038,041 | 7/1977 | Duvall et al. | 228/194 |
| 4,169,744 | 10/1979 | D'Silva | 75/171 |

OTHER PUBLICATIONS

"Semalloy Brazing Alloys", Sema-Alloys Tech. Bull. No. BA 65, (1965).
Ruhl, R. C. et al., "Splat Quenching of Iron-Nickel-Boron Alloys", Trans AIME, vol. 245, pp. 253–257.

*Primary Examiner*—Michael L. Lewis
*Attorney, Agent, or Firm*—Ernest D. Buff; Gerhard H. Fuchs

[57] ABSTRACT

Brazing of metal parts employing a thin, homogeneous, ductile, filler metal foil is disclosed. The brazing foil, useful for brazing stainless steels, is less than about 0.0025 inch thick and has a composition consisting essentially of 0 to about 4 atom percent iron, 0 to about 21 atom percent chromium, 0 to about 19 atom percent boron, 0 to about 12 atom percent silicon, 0 to about 22 atom percent phosphorus and the balance nickel and incidental impurities. In addition to containing the foregoing elements within the above-noted composition ranges, the composition must be such that the total of iron, chromium and nickel ranges from about 76 to 84 atom percent and the total of boron, silicon and phosphorus ranges from about 16 to 24 atom percent. The ductile foil permits fabrication of preforms of complex shapes which do not require binders and/or fluxes necessary for brazing powders presently used to braze stainless steels and nickel base alloys.

9 Claims, 1 Drawing Figure

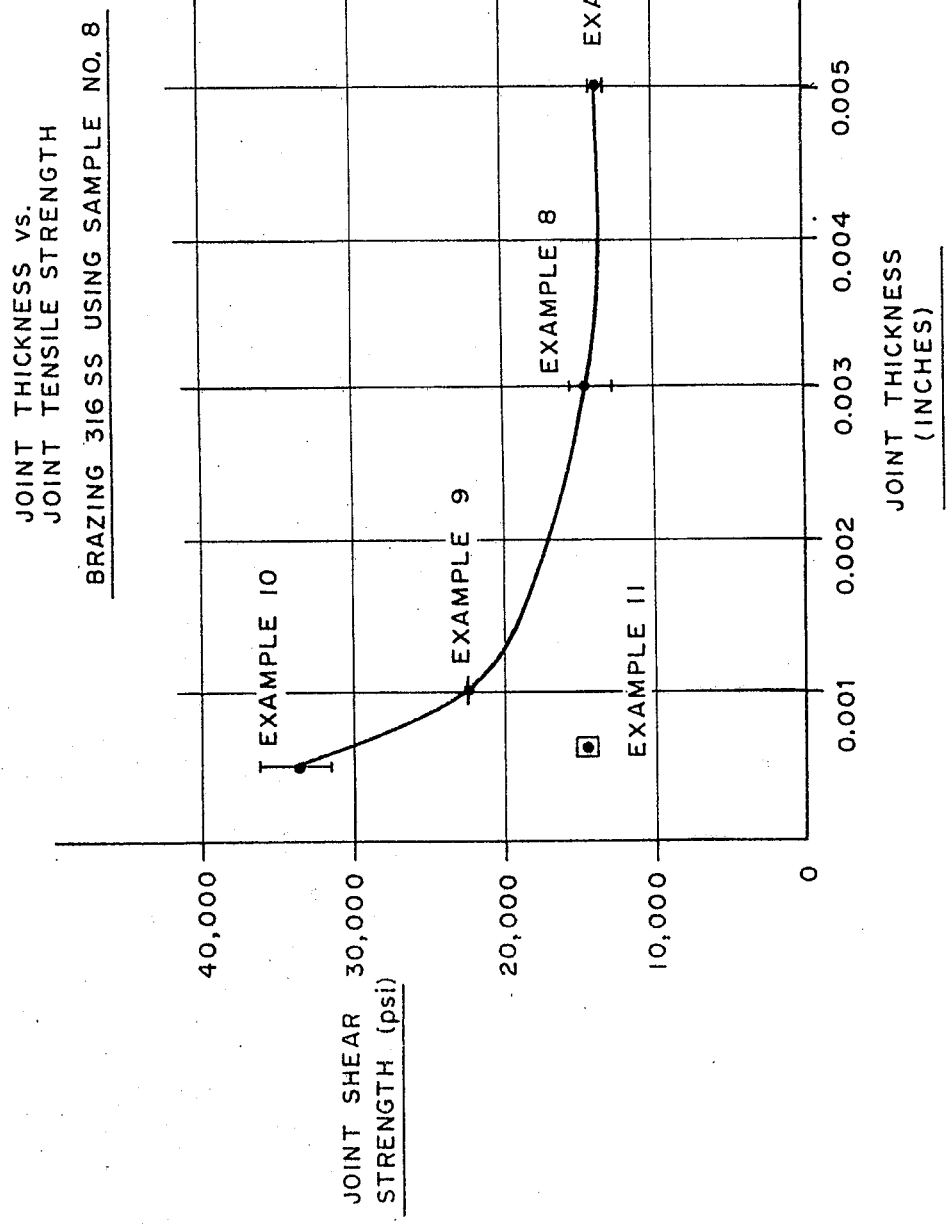

NICKEL BRAZED ARTICLES

CROSS-REFERENCE TO RELATED APPLICATIONS

This application is a continuation-in-part of copending application Ser. No. 008,370, filed Feb. 1, 1979, now abandoned, entitled "Homogeneous Ductile Brazing Foils" which, in turn, is a continuation-in-part of copending application Ser. No. 912,667, filed June 5, 1978, now U.S. Pat. No. 4,148,973 which, in turn, is a continuation of application Ser. No. 751,000, filed Dec. 15, 1976, now abandoned.

BACKGROUND OF THE INVENTION

1. Field of the Invention

This invention relates to brazing of metal parts and, in particular, to a homogeneous, ductile brazing material useful in brazing stainless steels and high nickel alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assemby. The assembly is then heated to a temperature sufficient to melt the filler metal. Upon cooling, a strong, corrosion resistant, leak-tight joint is formed.

As a class, stainless steel alloys are more difficult to braze than are carbon and low-alloy steels. This is apparently due to the high chromium content associated with stainless steels. The formation of chromium oxide on the surfaces of stainless steels prevents wetting by the molten metal filler. Consequently, heating and brazing must be performed on carefully cleaned metal parts either in vacuum or under strongly reducing conditions, such as dry hydrogen or cracked ammonia. Alternatively, chemically active fluxes which dissolve the oxide must be used. However, extensive post-brazing cleaning is required to remove flux residues.

The brazing alloys suitable for use with stainless steels, designated AWS BNi compositions, contain a substantial amount (about 3 to 11 weight percent) of metalloid elements such as boron, silicon and/or phosphorus. Consequently, such alloys are very brittle and are available only as powder, powder-binder pastes, powder-binder tapes and bulky cast preforms. Powders are generally unsuitable for many brazing operations, such as dip brazing, and do not easily permit brazing of complex shapes. Although some powders are available as pastes employing organic binders, the binders form objectionable voids and residues during brazing.

Some brazing alloys are available in foil form. Such materials are (1) fabricated through a costly sequence of rolling and careful heat-treating steps, (2) prepared by powder metallurgical techniques or (3) fabricated by quenching a melt of the alloy on a rotating quench wheel at a rate of at least about $10^5$ C./sec. Rolled foil is not sufficiently ductile to permit stamping of complex shapes therefrom. Powder metallurgical foil is not homogeneous and employs binders, which form objectionable voids and residues during brazing. Quenched foil, disclosed by U.S. Pat. No. 4,148,973, represents a substantial improvement over powdered and rolled foils, but has a thickness (about 0.0015 to 0.0025 inch) somewhat greater than that which has now been found to be required for maximum joint strength.

Ductile glassy metal alloys have been disclosed in U.S. Pat. No. 3,856,513, issued Dec. 24, 1974 to H. S. Chen et al. These alloys include compositions having the formula $M_a Y_b Z_c$, where M is a metal selected from the group consisting of iron, nickel, cobalt, vanadium and chromium, Y is an element selected from the group consisting of phosphorus, boron and carbon, and Z is an element selected from the group consisting of aluminum, silicon, tin, germanium, indium, antimony and beryllium, "a" ranges from about 60 to 90 atom percent, "b" ranges from about 10 to 30 atom percent and "c" ranges from about 0.1 to 15 atom percent. Also disclosed are glassy wires having the formula $T_i X_j$, where T is at least one transition metal and X is an element selected from the group consisting of phosphorus, boron, carbon, aluminum, silicon, tin, germanium, indium, beryllium and antimony, "i" ranges from about 70 to 87 atom percent and "j" ranges from about 13 to 30 atom percent. Such materials are conveniently prepared by rapid quenching from the melt using processing techniques that are now well-known in the art. No brazing compositions are disclosed therein, however.

There remains a need in the art for a homogeneous, brazing material that is available in thin, ductile foil form.

SUMMARY OF THE INVENTION

In accordance with the invention, there is provided a homogeneous, ductile brazing foil useful as a filler metal for a brazed metal article. The brazing foil is composed of metastable material having at least 50 percent glassy structure, and has a thickness less than about 0.0025 inch. It has been found that use of a brazing foil that is flexible, thin and homogeneous, as described above, improves braze joint strength, enhances joining precision and reduces process time.

More specifically, the brazing foil has a thickness of about 0.0005 to 0.0014 inch. Preferably, such foil has a composition consisting essentially of 0 to about 4 atom percent iron, 0 to about 21 atom percent chromium, 0 to about 19 atom percent boron, 0 to about 12 atom percent silicon, 0 to about 22 atom percent phosphorus and the balance essentially nickel and incidental impurities. In addition to containing the foregoing elements within the above-noted composition ranges, the composition must be such that the total of iron, chromium and nickel ranges from about 76 to 84 atom percent and the total of boron, silicon and phosphorus constitutes the remainder, that is, about 16 to 24 atom percent.

The homogeneous brazing foil of the invention is fabricated by a process which comprises forming a melt of the composition and quenching the melt on a rotating quench wheel at a rate of at least about $10^5$ C./sec.

The filler metal foil is easily fabricable as homogeneous, ductile ribbon, which is useful for brazing as cast. Advantageously, the metal foil can be stamped into complex shapes to provide braze preforms.

Further, the homogeneous, ductile brazing foil of the invention eliminates the need for binders and pastes that would otherwise form voids and contaminating residues. Also, the filler material provided by the invention enables alternative brazing processes of stainless steels, e.g., dip brazing in molten salts, to be employed.

BRIEF DESCRIPTION OF THE DRAWINGS

The invention will be more fully understood and further advantages will become apparent when reference is made to the following detailed description of the preferred embodiments of the invention and the accompanying drawing, which is a graph showing the relationship between thickness and shear strength of a brazed joint incorporating the elements of the present invention.

DETAILED DESCRIPTION OF THE INVENTION

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous, ductile brazing material in foil form is provided. The brazing foil is less than 0.0025 inch thick, preferably about 0.0015 to 0.0025 inch thick and most preferably about 0.0005 to 0.0014 inch thick. Preferably, the brazing foil has a composition consisting essentially of 0 to about 4 atom percent iron, 0 to about 21 atom percent chromium, 0 to about 19 atom percent boron, 0 to about 12 atom percent silicon, 0 to about 22 atom percent phosphorus and the balance essentially nickel and incidental impurities. The composition is such that the total of iron, chromium and nickel ranges from about 76 to 84 atom percent and the total of boron, silicon and phosphorus comprises the balance, that is, about 16 to 24 atom percent. These compositions are compatible with and more noble than stainless steels and are suitable for brazing austenitic, martensitic and ferritic stainless steels, as well as nickel base alloys.

By homogeneous is meant that the foil, as produced, is of substantially uniform composition in all dimensions. By ductile is meant that the foil can be bent to a round radius as small as ten times the foil thickness without fracture.

Examples of brazing alloy compositions within the scope of the invention are set forth in Table I below.

TABLE I

| | Composition, % | | | | | |
|---|---|---|---|---|---|---|
| | Fe | Ni | Cr | B | Si | P |
| Ni—P atom % | — | 81 | — | — | — | 19 |
| weight % | — | 89 | — | — | — | 11 |
| Ni—Cr—P atom % | — | 68.6 | 14.3 | — | — | 17.1 |
| weight % | — | 76 | 14 | — | — | 10 |
| Ni—Si—B(1) atom % | — | 80.9 | — | 9.0 | 10.1 | — |
| weight % | — | 92.4 | — | 1.9 | 5.5 | — |
| Ni—Si—B(2) atom % | — | 78 | — | 14 | 8 | — |
| weight % | — | 92.4 | — | 3.1 | 4.5 | — |
| Ni—Cr—Fe—Si—B atom % | 2.7 | 68.8 | 6.6 | 14.0 | 7.9 | — |
| weight % | 3 | 82.4 | 7 | 3.1 | 4.5 | — |
| Ni—Cr—B atom % | — | 69.4 | 14.4 | 16.2 | — | — |
| weight % | — | 81.5 | 15 | 3.5 | — | — |
| Ni—Cr—Fe—Si—B atom % | 3.5 | 63.5 | 12.3 | 12.8 | 7.9 | — |
| weight % | 4 | 75.7 | 13 | 2.8 | 4.5 | — |
| Ni—Cr—Fe—Si—B atom % | 3 | 66 | 7 | 18 | 6 | — |
| weight % | 3.5 | 81.2 | 7.7 | 4.1 | 3.5 | — |
| Ni—Cr—Fe—Si—B atom % | 3 | 59 | 18 | 16 | 4 | — |
| weight % | 3.4 | 71.4 | 19.3 | 3.6 | 2.3 | — |

The brazing temperature of the brazing alloys of the invention ranges from about 925° to 1205° C. (1700° to 2200° F.). The temperature of brazing is thus above the sensitizing temperature range of the 300 series stainless steels. This is in contrast to the brazing temperatures of silver brazing alloys, which fall within the sensitizing temperature range. As is well-known, when 18-8 stainless steels are heated at about 510° to 790° C. (950° to 1450° F.) for any appreciable length of time, they become sensitized or susceptible to intergranular corrosion. This is apparently due to the depletion of chromium in the grain-boundary areas. Sensitizing is thus avoided by use of the brazing foils of the invention.

The brazing foils of the invention are prepared by cooling a melt of the desired composition at a rate of at least about $10^5$ C./sec, employing metal alloy quenching techniques well-known to the glassy metal alloy art; see, e.g., U.S. Pat. Nos. 3,856,513 and 4,148,973, discussed earlier. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal alloys must be at least 80% glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 0.0005 to 0.0025 inch thick, which is also the desired spacing between bodies being brazed. Foil thickness, and hence spacing of about 0.0005 to 0.0014 inch maximizes the strength of the braze joint. Thinner foils stacked to form a thickness of greater than 0.0025 inch may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

In general, the strength of the resulting brazed joints is generally at least equal to that of brazed joints prepared from conventional powder brazes of the same composition. With alloys based on the Ni-B-Si system, braze joints made with thin ductile brazing ribbons of the invention are consistently stronger than joints made with thicker ribbon or with paste. With alloys based on the Ni-P system, braze joints made with ribbon and paste exhibit approximately the same shear strength. Without subscribing to any particular theory, it appears that the lower surface area of the ribbon, which would be less susceptible to oxidation than powder, and the greater area of contact between base metal and ribbon as compared with base metal and powder contribute significantly to joint strength.

The brazing foils of the invention are also superior to various powder brazes of the same composition in providing good braze joints. This is probably due to the ability to apply the brazing foil where the braze is required, rather than depending on capillarity to transport braze filler from the edge of surfaces to be brazed.

EXAMPLES

Example 1

Ribbons about 2.5 to 25.4 mm (about 0.10 to 1.00 inch) wide and about 13 to 60 μm (about 0.0005 to 0.0025 inch) thick were formed by squirting a melt of the particular composition by overpressure of argon onto a rapidly rotating copper chill wheel (surface speed about 3000 to 6000 ft/min). Metastable, homogeneous ribbons of substantially glassy alloys having the following compositions in weight percent and atom percent were produced:

|            | Composition |      |      |      |      |      |
|------------|------|------|------|------|------|------|
| Sample No. | Fe   | Ni   | Cr   | B    | Si   | P    |
| 1 (wt %)   | 3.0  | 82.4 | 7    | 3.1  | 4.5  | —    |
| (at %)     | 2.7  | 68.8 | 6.6  | 14.0 | 7.9  | —    |
| 2 (wt %)   | —    | 89   | —    | —    | —    | 11   |
| (at %)     | —    | 81   | —    | —    | —    | 19   |
| 3 (wt %)   | —    | 76   | 14   | —    | —    | 10   |
| (at %)     | —    | 68.6 | 14.3 | —    | —    | 17.1 |
| 4 (wt %)   | —    | 92.4 | —    | 1.9  | 5.5  | —    |
| (at %)     | —    | 80.9 | —    | 9.0  | 10.1 | —    |
| 5 (wt %)   | —    | 81.5 | 15   | 3.5  | —    | —    |
| (at %)     | —    | 69.4 | 14.4 | 16.2 | —    | —    |
| 6 (wt %)   | —    | 92.4 | —    | 3.1  | 4.5  | —    |
| (at %)     | —    | 78   | —    | 14   | 8    | —    |
| 7 (wt %)   | 4    | 75.7 | 13   | 2.8  | 4.5  | —    |
| (at %)     | 3.5  | 63.5 | 12.3 | 12.8 | 7.9  | —    |
| 8 (wt %)   | 3.5  | 81.2 | 7.7  | 4.1  | 3.5  | —    |
| (at %)     | 3    | 66   | 7    | 18   | 6    | —    |
| 9 (wt %)   | 3.4  | 71.4 | 19.3 | 3.6  | 2.3  | —    |
| (at %)     | 3    | 59   | 18   | 16   | 4    | —    |

Example 2

Tensile test specimens were cut from AISI types 430SS and 304SS in strip form. The thicknesses were both 0.036 inch. A brazing alloy of the invention, a glassy, ductile ribbon of nominal composition of Sample No. 2 within specification AWS A5.8-76 for BNi6 and having dimensions 0.0017 inch thick by 0.175 inch wide, was used to braze some of the test specimens. For comparison, a brazing paste of the same composition and specification, sold under the trade designation Nicrobraz® 10 (available commercially from Wall-Colmonoy Co. of Detroit, Michigan), was used to braze other test specimens.

The tensile specimens were dimensioned and fabricated per ASTM D638 and were of the type I variety. The tensile specimens were cut perpendicularly to the length direction at the mid-point of the length. Braze joints were of the lap type, with the lap dimension carefully controlled to ⅜ inch or ½ inch (for type 430 stainless steel) or ⅝ inch or ¾ inch (for type 304 stainless steel). Uncut tensile specimens were kept as controls to determine tensile properties after the brazing cycle. Brazing specimens were degreased with warm benzene. Lap joints containing brazing ribbons of the invention were assembled with either one ribbon or four ribbons side-by-side the length of the lap joint. In the case of these brazing alloys, the ribbons acted as the spacers. A single spot weld was used to hold the assembly together, as is common industrial practice.

Identical lap joints were prepared for use with the brazing paste. A spacer of 0.0015 inch type 410 stainless steel approximately 0.19 inch by 0.15 inch was used, as is conventional when employing brazing pastes. A single spot weld was made, employing identical welding parameters as above. Braze specimens utilizing the brazing paste had the paste applied in the prescribed manner as practiced commercially.

Brazing was done in a belt furnace with a dry, cracked ammonia atmosphere. The furnace was operated at 1900° F. at 1 ft/min. The length of the hot zone was 8 ft.

Upon brazing, all shear specimens and stainless steel controls were subjected to tensile shear testing, with the following results:

|       |              | Joint Shear Strength, psi | |
|-------|--------------|-------------|--------|
| Metal | Braze Filler | Range       | Avg.   |
| 304SS | brazing paste | 3,733–4,933 | 4,208 |
| 304SS | 1 ribbon     | 2,747–5,627 | 4,165 |
| 304SS | 4 ribbons    | 3,000–4,320 | 3,380 |
| 430SS | brazing paste | >4,267–>6,160 | >5,698 |
| 430SS | 1 ribbon     | >5,493–>5,893 | >5,693 |
| 430SS | 4 ribbons    | >6,880      | >6,880 |

The ultimate tensile strength of controls after brazing cycle was as follows:

AISI 304: 93,300 psi
AISI 430: 102,800 psi

The brazes on 430SS were observed to be stronger in general than on 304SS. As is well-known, thin brazes are subjected to triaxial stress conditions, and the resultant stress at failure is a function of the ultimate tensile stress of both the braze filler metal and the base metal. Since 430 stainless steel has a higher ultimate tensile strength than 304 stainless steel, brazed joints of 430 stainless steel appear to be stronger than brazed joints of 304 stainless steel.

All 430SS brazes were observed to fail in the base metal and not in the braze; therefore, the values reported are lower bounds.

Example 3

Tensile test specimens of AISI 430SS and 304SS were prepared for brazing as in Example 2. A brazing alloy of the invention, a glassy ductile ribbon of nominal composition of Sample No. 3 within specification AWS A5.8-76 for BNi7 and having dimensions 0.0021 inch thick by 0.106 inch wide was used to braze six test specimens.

Two ribbons side-by-side placed the length of the lap joint were used. For comparison, a brazing paste of the same composition and specification, sold under the trade designation Nicrobraz ® 50 was used to braze six test specimens.

Brazing was done in a belt furnace with a dry, cracked ammonia atmosphere. The furnace was operated at 1950° F. at 0.4 ft/min. The length of the hot zone was 8 ft.

The brazed joints evidenced the following joint shear strengths:

| Metal | Braze Filler | Joint Shear Strength, psi | |
| --- | --- | --- | --- |
| | | Range | Avg. |
| 304SS | brazing paste | 3,620–4,600 | 4,050 |
| 304SS | 2 ribbons | 3,320–4,220 | 3,790 |

In all the 430SS specimens, the base metal failed before the braze.

Of the six specimens brazed with brazing foil of the invention, good brazes were obtained in all cases. Of the six specimens brazed with brazing paste, good brazes were obtained in all cases.

Example 4

Tensile test specimens of AISI 430SS and 304SS were prepared for brazing as in Example 2. A brazing alloy of the invention, a glassy ductile ribbon of nominal composition of Sample No. 6 within specification AWS A5.8-76 for BNi3 and having dimensions 0.0021 inch thick by 0.108 inch wide was used to braze six test specimens. Two ribbons side-by-side placed the length of the lap joint were used. For comparison, a brazing paste of the same composition and specification, sold under the trade designation Nicrobraz ® 130, was used to braze six test specimens.

Brazing was done in a vacuum furnace which was evacuated to 0.1 μm then back-filled with $N_2$ to a partial pressure of 100 μm. The furnace was held at 1900° F. for 15 minutes.

The brazed joints evidenced the following joint shear strengths:

| Metal | Braze Filler | Joint Shear Strength, psi | |
| --- | --- | --- | --- |
| | | Range | Avg. |
| 304SS | brazing paste | 5,950–11,360 | 7,645 |
| 304SS | 2 ribbons | 7,900–10,510 | 9,050 |

In all the 430SS specimens, the base metal failed before the braze.

Of the six specimens brazed with brazing foil of the invention, good brazes were obtained in all cases. Of the six specimens brazed with brazing paste, good brazes were obtained in only four cases.

Example 5

Tensile test specimens of AISI 430SS and 304SS were prepared for brazing as in Example 2. A brazing alloy of the invention, a glassy ductile ribbon of the nominal composition of Sample No. 1 within specification AWS A5.8-76 for BNi2 and having dimensions 0.0016 inch thick by 0.205 inch wide was used to braze six test specimens. One ribbon placed the length of the lap joint was used. For comparison, a brazing paste of the same composition and specification, sold under the trade designation Nicrobraz ® LM, was used to braze six test specimens.

Brazing was done in a vacuum furnace as in Example 4.

The brazed joints evidenced the following joint shear strengths:

| Metal | Braze Filler | Joint Shear Strength, psi | |
| --- | --- | --- | --- |
| | | Range | Avg. |
| 304SS | brazing paste | 5,310–8,630 | 6,940 |
| 304SS | 1 ribbon | 8,910–11,380 | 9,680 |

In all the 430SS specimens, the base metal failed before the braze.

Of the six specimens brazed with brazing foil of the invention, good brazes were obtained in all cases. Of the six specimens brazed with brazing paste, good brazes were obtained in only three cases.

Example 6

Test specimens were cut from 0.125 inch thick AISI type 316SS strip. Brazing alloy of the invention of nominal composition of Sample No. 8, 6.5 mm (0.25 inch) wide and 50 μm (0.002 inch) thick was used to braze three test specimens. Brazing alloy of the invention of nominal composition of Sample No. 9, 6.5 mm (0.25 inch) wide and 40 μm (0.0015 inch) thick was used to braze three test specimens.

Lap shear test specimens were prepared as per AWS C3.2. The lap dimension was carefully controlled at 0.375 inch (3× thickness of the base metal).

Brazing was done in a vacuum furnace. The furnace was evacuated to 0.1 μm and operated at 1900° F. for 15 minutes.

Upon brazing, all shear specimens were subjected to tensile shear testing, with the following results:

| Metal | Braze Filler | Joint Shear Strength, psi | |
| --- | --- | --- | --- |
| | | Range | Avg. |
| 316SS | 3 ribbons, Sample No. 8 | 18,260–18,347 | 18,289 |
| 316SS | 3 ribbons, Sample No. 9 | 14,667–18,560 | 16,242 |

In all cases, test specimens brazed with Sample No. 8 failed in the base metal. Therefore, the values reported are lower bounds. Two of the three test specimens brazed with Sample No. 9 failed in the joint. The third test specimen failed in the base metal.

Of the six specimens brazed in this example, good brazes were obtained in all cases.

Example 7

Test specimens were cut from 0.125 inch thick AISI 316SS strip. Brazing alloy of the invention of nominal composition of Sample No. 8, 12.7 mm (0.5 inch) wide and 25 μm (0.001 inch) thick, was used to braze two samples. Five layers of ribbon were stacked in the joint area. A joint spacer was used to set the final joint thickness at 127 μm (0.005 inch).

Lap shear test specimens were prepared as per AWS C3.2. The lap dimension was carefully controlled at 0.25 inch (2× thickness of the base metal).

Brazing was done in a vacuum furnace. The furnace was evacuated to 0.1 μm and operated at 1900° F. for 10 minutes.

Upon brazing, all shear specimens were subject to tensile shear testing with the following results:

| Metal | Braze Filler | Joint Shear Strength, psi | |
|---|---|---|---|
| | | Range | Avg. |
| 316SS | 5 ribbons, Sample No. 8 | 13,520–13,760 | 13,640 |

Example 8

Test specimens were cut from 0.125 inch thick AISI 316SS strip. Brazing alloy of the invention of nominal composition of Sample No. 8, 12.7 mm (0.5 inch) wide and 25 $\mu$m (0.001 inch) thick, was used to braze three samples. Three layers of ribbon were stacked in the joint area. A joint spacer was used to set the final joint thickness at 76 $\mu$m (0.003 inch).

Lap shear test specimens were prepared as per AWS C3.2. The lap dimension was carefully controlled at 0.25 inch (2× thickness of the base metal).

Brazing was done in a vacuum furnace. The furnace was evacuated to 0.1 $\mu$m and operated at 1900° F. for 10 minutes.

Upon brazing, all shear specimens were subject to tensile shear testing with the following results:

| Metal | Braze Filler | Joint Shear Strength, psi | |
|---|---|---|---|
| | | Range | Avg. |
| 316SS | 3 ribbons, Sample No. 8 | 12,700–15,520 | 14,743 |

Example 9

Test specimens were cut from 0.125 inch thick AISI 316SS strip. Brazing alloy of the invention of nominal composition of Sample No. 8, 12.7 mm (0.5 inch) wide and 25 $\mu$m (0.001 inch) thick, was used to braze one sample. One layer of ribbon was placed in the joint area. A joint spacer was used to set the final joint thickness at 25 $\mu$m (0.001 inch).

Lap shear test specimens were prepared as per AWS C3.2. The lap dimension was carefully controlled at 0.25 inch (2× thickness of the base metal).

Brazing was done in a vacuum furnace. The furnace was evacuated to 0.1 $\mu$m and operated at 1900° F. for 10 minutes.

Upon brazing, all shear specimens were subject to tensile shear testing with the following results:

| Metal | Braze Filler | Joint Shear Strength, psi | |
|---|---|---|---|
| | | Range | Avg. |
| 316SS | 1 ribbon, Sample No. 8 | 22,500 | — |

Example 10

Test specimens were cut from 0.125 inch thick AISI 316SS strip. Brazing alloy of the invention of nominal composition of Sample No. 8, 12.7 mm (0.5 inch) wide and 25 $\mu$m (0.001 inch) thick, was used to braze three samples. One layer of ribbon was placed in the joint area. A joint spacer was used to set the final joint thickness at 13 $\mu$m (0.0005 inch). The excess filler metal formed a fillet around the joint.

Lap shear test specimens were prepared as per AWS C3.2. The lap dimension was carefully controlled at 0.25 inch (2× thickness of the base metal).

Brazing was done in a vacuum furnace. The furnace was evacuated to 0.1 $\mu$m and operated at 1900° F. for 10 minutes.

Upon brazing, all shear specimens were subject to tensile shear testing with the following results:

| Metal | Braze Filler | Joint Shear Strength, psi | |
|---|---|---|---|
| | | Range | Avg. |
| 316SS | 1 ribbon, Sample No. 8 | 31,680–36,320 | 33,653 |

Example 11

Test specimens were cut from 0.125 inch thick AISI 316SS strip. Brazing alloy of the invention of nominal composition of Sample No. 8, 0.64 mm (0.25 inch) wide and 15 $\mu$m (0.0006 inch) thick, was used to braze four samples. One layer of ribbon was placed in the joint area. A joint spacer was not used. The final joint thickness was 15 $\mu$m (0.0006 inch).

Lap shear test specimens were prepared as per AWS C3.2. The lap dimension was carefully controlled at 0.25 inch (2× thickness of the base metal).

Brazing was done in a vacuum furnace. The furnace was evacuated to 0.1 $\mu$m and operated at 1900° F. for 10 minutes.

Upon brazing, all shear specimens were subject to tensile shear testing with the following results:

| Metal | Braze Filler | Joint Shear Strength, psi | |
|---|---|---|---|
| | | Range | Avg. |
| 316SS | 1 ribbon, Sample No. 8 | 6,640–28,400 | 14,740 |

The data of Examples 7 to 10 demonstrate increased joint strength with decreasing thickness, provided that a sufficient amount of filler metal occupies the joint volume. This is illustrated in FIG. 1. However, at small joint clearances, it becomes more difficult for the molten filler metal to adequately distribute itself throughout the entire joint. If an insufficient amount of filler metal is used, or if extensive flow of the filler metal is required, as in Example 11 where a thin filler metal foil was employed, joint strength will be reduced.

What is claimed is:

1. A brazed metal article, said article having been brazed with a filler metal in the form of a homogenous, ductile brazing foil composed of metastable material having at least 50% glassy structure and a composition consisting essentially of 0 to about 4 atom percent iron, 0 to about 21 atom percent chromium, 0 to about 19 atom percent boron, 0 to about 12 atom percent silicon, 0 to about 22 atom percent phosphorus and the balance essentially nickel and incidental impurities, wherein the composition is such that the total of iron, chromium and nickel ranges from about 76 to 84 atom percent and the total of boron, phosphorus and silicon ranges from about 16 to 24 atom percent.

2. The brazed metal article of claim 1 which is at least about 80% glassy.

3. The brazed metal article of claim 1 which is substantially glassy.

4. The brazed metal article of claim 1 having a thickness ranging from about 0.0015 to 0.0025 inch.

5. A brazed metal article, said article having been brazed with a filler metal in the form of a homogeneous, ductile brazing foil composed of metastable material having at least 50% glassy structure and a composition consisting essentially of 0 to about 4 atom percent iron, 0 to about 21 atom percent chromium, 0 to about 19 atom percent boron, 0 to about 12 atom percent silicon, 0 to about 22 atom percent phosphorus and the balance essentially nickel and incidental impurities, wherein the composition is such that the total of iron, chromium and nickel ranges from about 76 to 84 atom percent and the total of boron, phosphorus and silicon ranges from about 16 to 24 atom percent, said foil having a thickness less than about 0.0025 inch.

6. The brazing foil of claim 5 which is at least about 50% glassy.

7. The brazed metal article of claim 5 which is at least about 80% glassy.

8. The brazed metal article of claim 5 which is substantially glassy.

9. The brazed metal article of claim 5 having a thickness ranging from about 0.0005 to 0.0014 inch.

* * * * *